UNITED STATES PATENT OFFICE.

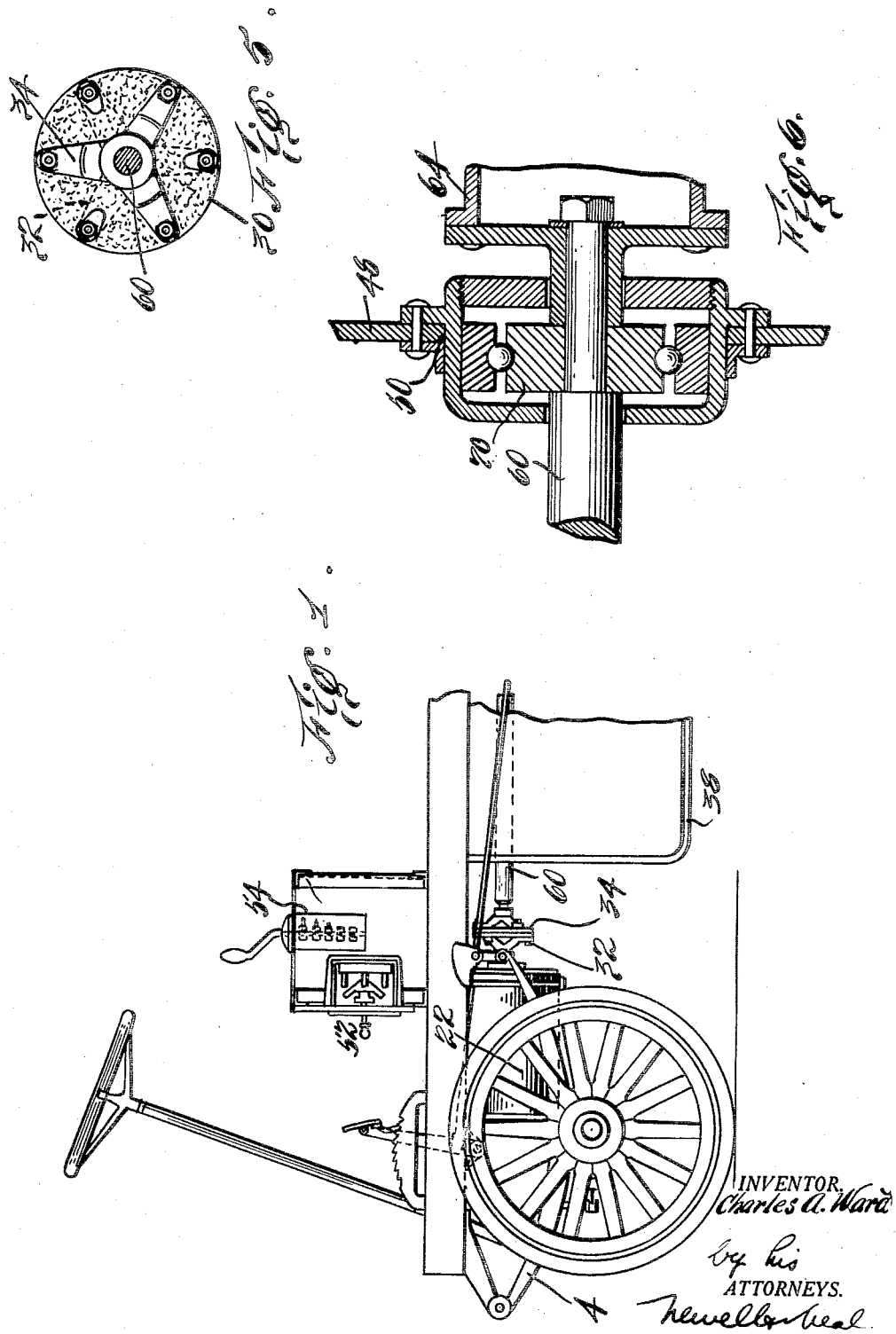

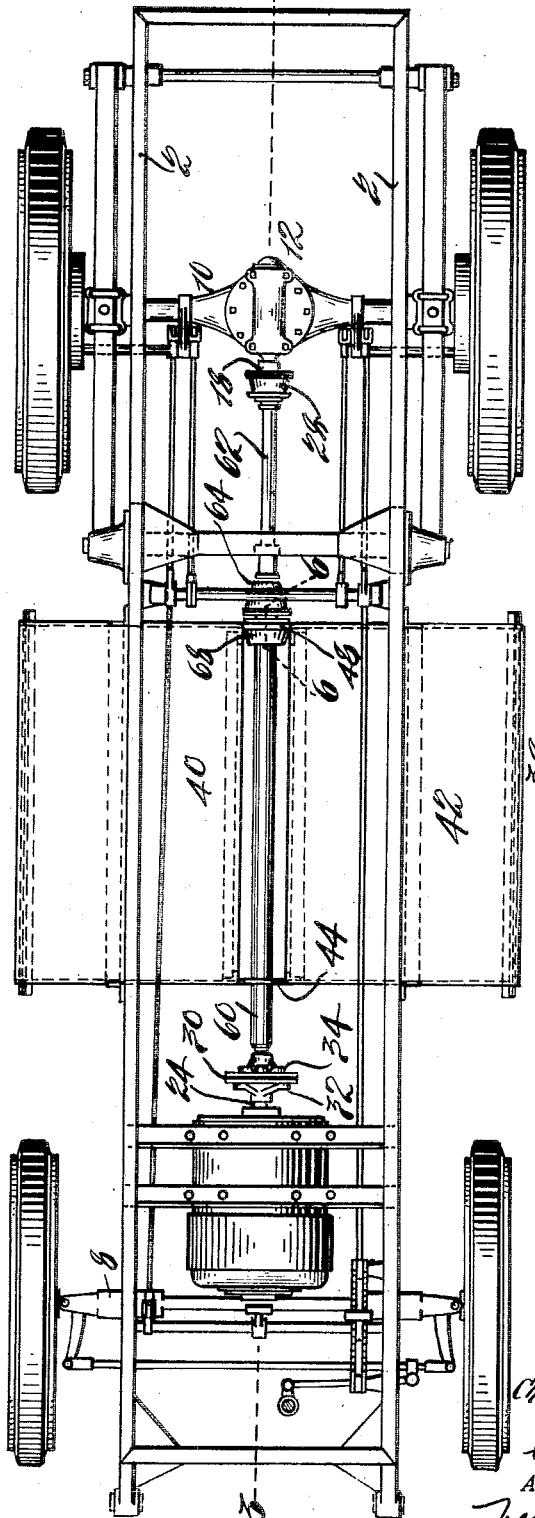

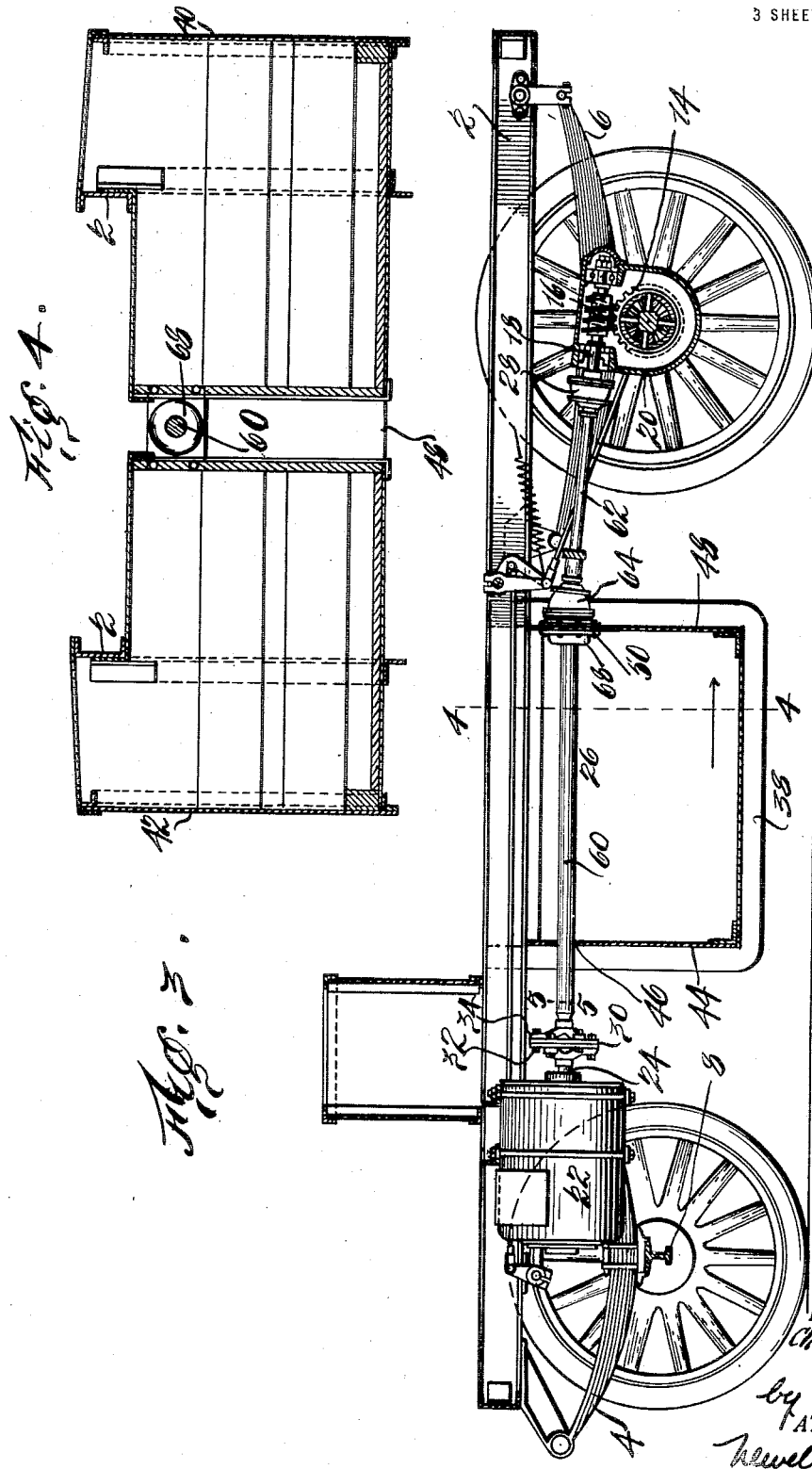

CHARLES A. WARD, OF MOUNT VERNON, NEW YORK.

MOTOR-VEHICLE.

1,309,164. Specification of Letters Patent. Patented July 8, 1919.

Application filed October 23, 1917. Serial No. 198,159.

*To all whom it may concern:*

Be it known that I, CHARLES A. WARD, a citizen of the United States, residing at Mount Vernon, New York, have invented certain new and useful Improvements in Motor-Vehicles, of which the following is a clear, full, and exact description.

My invention relates to motor vehicles and more particularly to electrically driven motor trucks.

An object of my invention is to provide a compact arrangement of the motor and the parts functionally associated therewith, which will result in an increased efficiency in the transmission of power from the motor to the axle of the truck, and in a decrease in the liability to breakage of parts hitherto subject to excessive strain.

Other objects and advantages will appear from the subjoined description and the accompanying drawings, in which parts not essential to the understanding of my invention have generally been omitted and in which Figure 1 is a side view of a motor truck equipped with my invention;

Fig. 2 is a partial plan view thereof, with parts omitted;

Fig. 3 is an elevational view, partly in section on line 3—3 of Fig. 2;

Fig. 4 shows a transverse cross-section on line 4—4 of Fig. 3;

Fig. 5 shows a fragmental cross-section on line 5—5 of Fig. 3; and

Fig. 6 is an enlarged sectional detail view, the section being taken on a line 6—6 in Fig. 2.

In the preferred embodiment of my invention I provide a truck frame 2 resiliently carried by springs 4 and 6 on front and rear axles 8 and 10 respectively. The rear axle is equipped with differential gearing 12, the master gear 14 of which meshes with a worm 16 on the short driving shaft 18 mounted in bearings in the differential housing 20.

From near the front end of the frame is suspended an electric motor 22 with its horizontal shaft 24 extending longitudinally of the truck frame, the motor being preferably rigidly secured to the truck frame. The motor shaft 24 is connected to the driving shaft 18 by a propeller shaft indicated as a whole by reference numeral 26. This propeller shaft is, by means of a universal joint 28, flexibly connected at its rear end to the front end of the driving shaft 18, and at its forward end is flexibly connected to the rear end of the motor shaft 24, by a suitable universal joint comprising, in the form shown, a disk 30 of flexible material to the opposite sides of which the motor and propeller shafts are respectively secured at non-alined points by means of spiders 32 and 34 bolted thereto.

The batteries (not shown) for the motor 22 are carried in a cradle 38 suspended from the frame 2 intermediate between the motor 22 and the rear axle. This cradle comprises two sections 40 and 42, spaced transversely of the truck frame to provide an aisle between them for the passage of the propeller shaft 26, as clearly shown in Figs. 2 and 4. A common front end plate 44 extends across the front ends of the cradle sections and is provided with an opening 46 for the accommodation of the propeller shaft. A common rear end plate 48 is similarly arranged with a shaft opening 50. This arrangement of end plates braces and strengthens the cradle frames.

At the front of the truck frame adjacent both the motor and the batteries are mounted, on suitable supports, the switch 52 and controller 54 and these are connected, by short lengths of conductors (not shown) in circuit with the batteries and the motor, thus providing a compact power plant installation requiring a minimum amount of wiring.

I am aware of the United States patent to Rae, No. 1,117,243 and the French patent to Oppermann, No. 342,842. The shaft construction shown in these patents is, however not suitable in practice for electrically driven vehicles. The propeller shaft of an electrically driven vehicle is normally operated at much higher rotative speeds than the shaft of an ordinary gas engine driven vehicle, and a long propeller shaft unsupported between the ends as shown in the patents referred to, when rotated at high speeds will develop centrifugal forces which will cause dangerous "whipping" or "thrashing" of the shaft, tending to break or bend it.

In the present construction this difficulty is avoided by supporting the long shaft 26 by a bearing 66 intermediate between its ends. Further, in order to provide for greater flexibility of the propeller shaft 26 so as to endure the distortions and twistings to which motor truck frames are subjected in heavy service, it is divided into sections, comprising preferably a substantially horizontal front section 60 and a normally inclined rear section 62, the two sections being flexibly connected to each other by a universal joint 64, said shaft being supported by the bearing 66 adjacent to said universal joint. This bearing is preferably formed by securing to the rear end plate 48 of the battery cradle a member 68, which may be the forward member of the housing for the universal joint 64, and fitting therein suitable bearing rings 70.

By this arrangement a propeller shaft is provided which will transmit the rotations of the motor shaft carried with the frame uniformly to the worm drive shaft carried with the rear axle and said shaft may be given high rotative speeds without dangerous whipping or threshing and due to its flexibility will not be affected by the frame distortions even during the most severe service.

While I have herein disclosed a specific embodiment of my invention, it is to be understood that in order to meet the different conditions of practical use, modifications as to details may be adopted and the appended claims are, except as necessarily limited by the state of the art, to be interpreted as including all such modifications.

What I claim as new is:—

1. In a motor vehicle, a frame, a rear axle on which said frame is supported, drive gearing on the rear axle comprising a high speed driving shaft and reducing connections from said shaft to the vehicle driving wheels, a motor on the front end of the frame provided with a shaft, a long propeller shaft flexibly connected to said front shaft and to said driving shaft and forming with said first mentioned shafts a single continuous driving shaft from said motor to said rear axle, and means carried by said frame for supporting said propeller shaft between said flexible connections.

2. In a motor vehicle, a frame, a rear axle on which said frame is supported, drive gearing on the rear axle comprising a high speed driving shaft and reducing connections from said shaft to the vehicle driving wheels, a motor on the front end of the frame provided with a shaft, a long propeller shaft formed of two sections constantly flexibly connected directly to each other and to said motor shaft and to said driving shaft respectively, and means carried by said frame for supporting said propeller shaft near the joint between its sections, said propeller shaft forming with said first mentioned shafts a single continuous driving shaft from said motor to said rear axle.

3. In a motor vehicle, a frame, a rear axle on which said frame is supported, drive gearing on the rear axle comprising a high speed driving shaft and reducing connections from said shaft to the vehicle driving wheels, a motor mounted on the front end of the frame provided with a shaft, a long propeller shaft formed of two sections constantly flexibly connected directly to each other, and to said motor shaft and to said driving shaft respectively, and said propeller shaft forming with said first mentioned shafts a single continuous driving shaft from said motor to said rear axle, means suspended from said frame and having bearings below said frame for supporting said propeller shaft adjacent to the joint between its sections whereby whipping of said propeller shaft is prevented.

4. In a motor vehicle, a frame, an axle on which the frame is resiliently supported, drive gearing on the axle comprising a high speed driving shaft, and reducing connections to the vehicle driving wheels, a motor on said frame provided with a shaft, a battery cradle on said frame intermediate said motor and axle and comprising two sections spaced apart transversely of said frame, a propeller shaft extending between said cradle sections and constantly flexibly connected directly to said motor shaft and to said driving shaft, the flexible connection to the motor shaft being between said motor and battery cradle, and said propeller shaft comprising two sections connected by a universal joint, and means for supporting said propeller shaft adjacent to said universal joint.

5. In a motor vehicle, a frame, an axle on which the frame is resiliently supported, drive gearing on the axle comprising a driving shaft, a motor on said frame provided with a shaft, a battery cradle on said frame intermediate said motor and axle and comprising two sections spaced apart transversely of said frame, a propeller shaft extending between said cradle sections and flexibly connected to said motor shaft and said driving shaft, said propeller shaft comprising two sections connected by a universal joint, and a bearing on said battery cradle for supporting said propeller shaft adjacent said universal joint.

6. In a motor vehicle, a frame, an axle on which the frame is resiliently supported, an electric motor mounted on the frame, sectional power-shafting connecting said motor to said rear axle, a battery cradle suspended from the frame intermediate said motor and axle, said cradle comprising two sections one at each side of said power-shafting, and a common end plate connecting the two sections, said end plate provided with a bearing for an intermediate portion of said power-shafting.

7. In a motor vehicle, a frame, an axle on which the frame is resiliently supported, an electric motor mounted on the frame, sectional power-shafting connecting said motor to said rear axle, a battery cradle suspended from the frame intermediate said motor and axle, said cradle comprising two sections one at each side of said power-shafting, and common front and rear end plates connecting the two sections and having openings for said shafting, the opening in one of said end plates being provided with a bearing for said shafting.

8. In a motor vehicle, an axle on which the frame is resiliently supported, an electric motor mounted on the frame having a horizontal shaft, drive gearing mounted on the rear axle comprising a driving shaft and reducing connections to the vehicle driving wheels, a propeller shaft comprising a horizontal section flexibly connected at its front end directly to said motor shaft, a normally inclined section flexibly connected by a universal joint to the rear end of said horizontal section and to the front end of said driving shaft, said propeller shaft forming with said first mentioned shafts a single continuous driving shaft from said motor to said rear axle, and a support for said propeller shaft near the section junction.

9. In a motor vehicle, an axle on which the frame is resiliently supported, an electric motor mounted on the frame having a horizontal shaft, drive gearing mounted on the rear axle comprising a driving shaft, a propeller shaft comprising a horizontal section flexibly connected at its front end to said motor shaft, a normally inclined section flexibly connected by universal joints to the rear end of said horizontal section and the front end of said driving shaft, a battery cradle comprising two sections, one suspended from the frame at each side of said horizontal propeller shaft section, and means connecting the rear ends of said cradle sections and provided with a bearing in which the rear end of said horizontal propeller shaft section is rotatably supported.

Signed at New York, N. Y., this 3d day of October, 1917.

CHARLES A. WARD.